United States Patent [19]

Iiyama et al.

[11] Patent Number: 4,940,691
[45] Date of Patent: Jul. 10, 1990

[54] COLORING PHTHALIDE COMPOUNDS AND RECORDING MATERIALS USING THE COMPOUNDS AS COLORING COMPONENT

[75] Inventors: Kiyotaka Iiyama, Mishima; Kunio Hayakawa, Gotenba, both of Japan

[73] Assignee: Ricoh Company, Ltd., Tokyo, Japan

[21] Appl. No.: 355,962

[22] Filed: May 19, 1989

Related U.S. Application Data

[63] Continuation-in-part of Ser. No. 210,208, Jun. 17, 1988, abandoned, which is a continuation of Ser. No. 84,446, Aug. 12, 1987, abandoned.

[30] Foreign Application Priority Data

Aug. 14, 1986 [JP] Japan .................................. 61-191106
Dec. 19, 1986 [JP] Japan .................................. 61-303540
Jul. 1, 1987 [JP] Japan .................................. 62-164844

[51] Int. Cl.$^5$ .............................................. B41M 5/18
[52] U.S. Cl. ................................. 503/220; 427/151;
428/913; 503/217
[58] Field of Search ............................. 427/150–152;
428/913; 503/216, 217, 220, 225; 549/307

[56] References Cited

U.S. PATENT DOCUMENTS

| 4,020,056 | 4/1977 | Farber | 503/220 |
| 4,022,771 | 5/1977 | Farber | 260/240 D |
| 4,630,080 | 12/1986 | Satake et al. | 503/217 |
| 4,641,160 | 2/1987 | Kondo et al. | 503/220 |

FOREIGN PATENT DOCUMENTS

| 0062544 | 10/1982 | European Pat. Off. | 503/220 |
| 60-8364 | 1/1985 | Japan | 503/220 |
| 60-73893 | 4/1985 | Japan | 503/220 |
| 1492913 | 11/1977 | United Kingdom | 503/220 |
| 2112156A | 7/1983 | United Kingdom | 503/225 |

Primary Examiner—Bruce H. Hess
Attorney, Agent, or Firm—Flynn, Thiel, Boutell & Tanis

[57] ABSTRACT

Coloring phthalide compounds having general formula

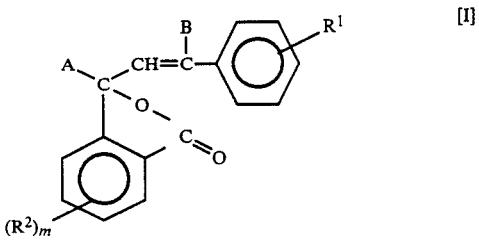

wherein A and B each represent

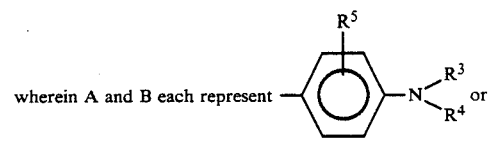

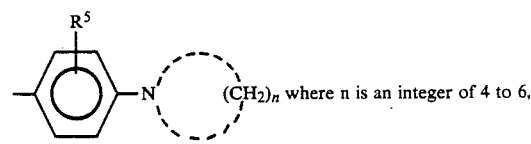

where n is an integer of 4 to 6, $R^1$ represents hydrogen, an alkyl group, or halogen, m is an integer of 1 to 4, when m is 1, $R^2$ represents hydrogen, an amino group, an alkylamino group, a dialkylamino group, a cyclic amino group, an alkyl group, or halogen, when m is 2 to 4, $R^2$ represents halogen, $R^3$ and $R^4$ each represent a straight chain or branched alkyl group having 1 to 8 carbon atoms, a cyclic alkyl group, or a benzyl group, and $R^5$ represents hydrogen, an alkyl group or an alkoxyl group; and a thermosensitive recording material including a thermosensitive recording layer comprising any of the above coloring phthalides and a color developer capable of inducing color formation in the phthalide compound are disclosed.

3 Claims, No Drawings

COLORING PHTHALIDE COMPOUNDS AND RECORDING MATERIALS USING THE COMPOUNDS AS COLORING COMPONENT

This applicaton is an applicaton in part of U.S. application Ser. No. 07/210,208 filed on June 17, 1988, now abandoned, which is a continuation of U.S. application Ser. No. 07/084,446, filed Aug. 12, 1987, now abandoned.

BACKGROUND OF THE INVENTION

The present invention relates to novel coloring phthalide compounds and recording materials using any of the phthalide compounds as coloring component capable of yielding images which absorb the light in the near infrared region by thermosensitive recording, pressure-sensitive recording or by use of laser beams.

A conventional pressure-sensitive recording material utilizes a chemical reaction between a colorless or light-colored leuco dye and a color developer capable of inducing color formation in the leuco dye to form colored images. More specifically, the pressure-sensitive recording material comprises (i) a coloring leuco dye sheet coated with a leuco dye which is dissolved in an organic solution and microcapsuled and (ii) a color developer sheet coated with a color developer for the leuco dye and a binder agent. The coloring leuco dye sheet is superimposed on the color developer sheet and pressure is applied thereto in such a manner that the microcapsules containing the leuco dye are ruptured so as to react with the color developer.

A conventional thermosensitive recording material generally comprises a support such as paper, synthetic paper or plastic film, and a thermosensitive coloring layer comprising as the main components a leuco dye and a color developer cable of inducing color formation in the leuco dye upon application of heat thereto to form colored images. The application of heat for such image formation is carried out, for instance, by a thermal head, a thermal pen, laser beams or a stroboscope.

These pressure-sensitive and thermosensitive recording materials are widely used because recording can be carried out more speedily by using a relatively simple device, without the complicated steps such as development and fixing of images, as compared with the recording materials for electrophotography and electrostatic recording.

Conventionally employed representative leuco dyes for use in such recording materials are Crystal Violet Lactone and Leuco Crystal Violet which are for blue-coloring, and fluorane compounds having an anilino substituent at its 7 position which are for black coloring. Further, in the conventional thermosensitive recording material, colorless or light-colored leuco dyes having, for example, lactone, lactam, or spiropyran rings, are employed, and organic acids and phenolic acid materials are employed as the color developers for the leuco dyes.

Recently optical character-reading apparatus have been developed, for example, for reading bar codes in bar code labels, and are used in a variety of fields. In these apparatus, light sources emitting light having a light wavelength of 700 nm or more, such as a light emit diode and a semi-conductor laser, are in general use. However, the above-mentioned leuco dyes, when colored, scarcely absorb the light in the near infrared region having a wavelength of 700 nm or more, so that a light source emitting light in the near infrared region cannot be effectively used when the above-mentioned leuco dyes are employed in the recording materials.

In order to improve this shortcoming of the conventional leuco dyes, leuco dyes capable of absorbing not only light in the visible region, but also the light in the near infrared region, have been proposed, for instance, in Japanese Laid-Open Patent Applications 51-121035, 51-121037 and 57-167979. The leuco dyes proposed in these Japanese Laid-Open Patent Applications, however, are insufficient in the power of absorbing the light in the rear infrared region for use in practice.

SUMMARY OF THE INVENTION

It is therefore an object of the present invention to provide novel coloring phthalide compounds which, when colored, absorb the light in the near infrared region.

Another object of the present invention is to provide a recording material capable of yielding images which absorb the light in the near infrared region by using any of such coloring phthalide compounds as its coloring component.

A further object of the present invention is to provide a thermosensitive recording material by using any of the above coloring phthalide compounds and a particular color developer, which yields images capable of absorbing the light in the near infrared region and having excellent resistance to light.

The coloring phthalide compounds according to the present invention have the following general formula [I]:

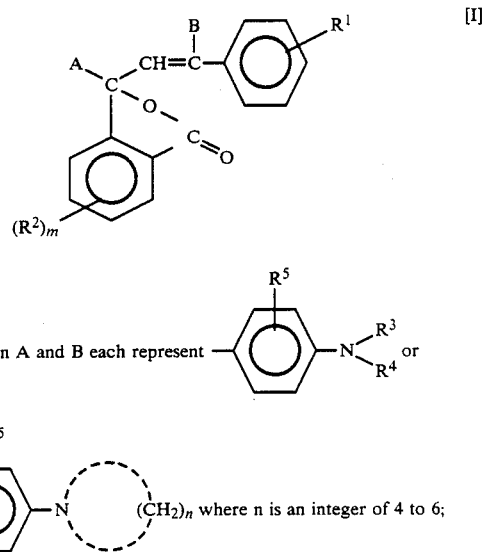

$R^1$ represents hydrogen, an alkyl group, or halogen; m is an integer of 1 to 4; when m is 1, $R^2$ represents hydrogen, an amino group, an alkylamino group, a dialkylamino group, a cyclic amino group, an alkyl group, or halogen; when m is 2 to 4, $R^2$ represents halogen; $R^3$ and $R^4$ each represent a straight chain or branched alkyl group having 1 to 8 carbon atoms, a cyclic alkyl group, or a benzyl group; and $R^5$ represents hydrogen, an alkyl group or an alkoxyl group.

Any of the above phthalide compounds can be used as a coloring component in combination with a conventional developer in a pressure-sensitive recording material and in a thermosensitive recording material.

In particular, when any of the above phthalide compounds is employed in combination with any of the following color developers in a thermosensitive recording material, a thermosensitive recording material which is improved on the resistance to light of the recorded images can be obtained:

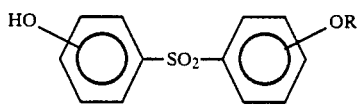

wherein R represents hydrogen, an alkyl group or an aralkyl group.

The phthalide compounds having the above general formula [I] are white or light-colored leuco dyes, and when they are brought into contact with a color developer, they are colored in blue to green, with an intensive light absorption in the near infrared region with a wavelength of 750 nm or more.

DETAILED DESCRIPTION OF THE PREFERRED EMBODIMENTS

Specific examples of a coloring phthalide having the general formula [I] according to the present invention are shown in Table 1.

This coloring phthalide having the general formula [I] can be prepared by allowing a compound having the following general formula [Ia] to react with a compound having the following general formula [Ib] in the presence of a dehydrating condensation agent.

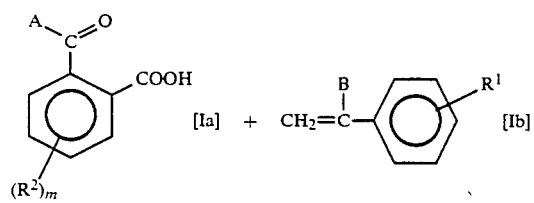

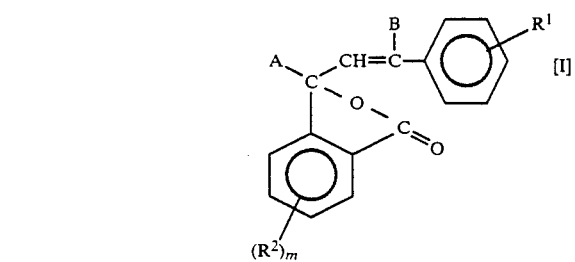

wherein A, B, $R^1$, $R^2$ and m are the same as those defined previously.

Examples of a dehydrating condensation agent for the above reaction are lower fatty acid anhydrides such as acetic anhydride and propionic anhydride which may serve as a solvent for the above reaction as well, inorganic acids such as phosphorus oxychloride, phosphorus trichloride, sulfuric acid, and polyphosphoric acid and a variety of conventional Friedel-Crafts catalysts.

In the present invention, the compound having the above formula [Ia] can be prepared by reacting a substituted aniline and a substituted phthalic anhydride in the presence of a Friedel-Crafts catalyst or by reacting a substituted aminobenzaldehyde with a substituted benzoic acid in the presence of a dehydrating catalyst such as acetic anhydride or sulfuric acid as shown below.

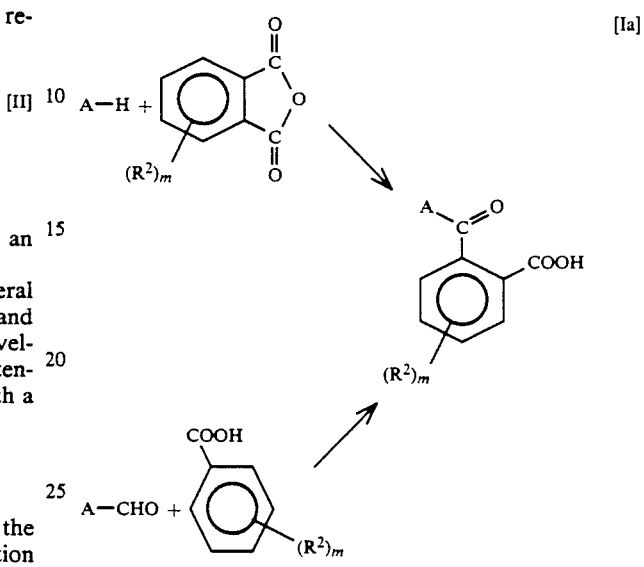

The compound having the formula [Ib] can be prepared by the following Grignard reaction:

wherein B and $R^1$ are the same as those defined previously.

The above method is significantly advantageous over, for example, the following method of using a Michler's ketone since the above compound can be produced inexpensively.

The following Table 1 shows specific examples of a phthalide compound for use in the present invention and of the starting materials therefor.

TABLE 1

| No. | [Ia] | [Ib] | [I] | Developed Color Tone |
|---|---|---|---|---|
| 1 | structure with (CH₃)₂N-phenyl-C(=O)-phenyl-COOH and CH₃-N-CH₃ | structure with (CH₃)₂N-phenyl-C(=CH₂)-phenyl | structure with two (CH₃)₂N-phenyl groups, phenyl, CH=C, and 4-(CH₃-N-CH₃)-phenyl-C(=O)-O | Bluish Green |
| 2 | " | structure with (C₂H₅)₂N-phenyl-C(=CH₂)-phenyl | structure with two (C₂H₅)₂N-phenyl groups, phenyl, CH=C, and 4-(CH₃-N-CH₃)-phenyl-C(=O)-O | Bluish Green |
| 3 | " | structure with (C₃H₇)₂N-phenyl-C(=CH₂)-phenyl | structure with two (C₃H₇)₂N-phenyl groups, phenyl, CH=C, and 4-(CH₃-N-CH₃)-phenyl-C(=O)-O | Bluish Green |

TABLE 1-continued

| No. | [Ia] | [Ib] | [I] | Developed Color Tone |
|---|---|---|---|---|
| 4 | (CH₃)₂N-C₆H₄-CO-C₆H₃(COOH)-N(CH₃)₂ structure | 4-(N,N-di-C₄H₉)aminophenyl-CH=CH₂ | Triarylmethane lactone with two 4-(N,N-dimethylamino)phenyl groups, one phenyl-CH=CH-, and 4-(N-methylamino)-2-carbonyl phenyl | Bluish Green |
| 5 | " | 4-(N-methyl-N-propyl)aminophenyl-CH=CH₂ | Triarylmethane lactone with N-CH₃,C₃H₇ substituents | Bluish Green |
| 6 | " | 4-(N-cyclohexyl-N-methyl)aminophenyl-CH=CH₂ | Triarylmethane lactone with N-cyclohexyl,CH₃ substituents | Bluish Green |

TABLE 1-continued

| No. | [Ia] | [Ib] | [I] | Developed Color Tone |
|---|---|---|---|---|
| 7 | (structure) | (structure) | (structure) | Bluish Green |
| 8 | ″ | (structure) | (structure) | Bluish Green |
| 9 | ″ | (structure) | (structure) | Bluish Green |

TABLE 1-continued

| No. | [1a] | [1b] | [I] | Developed Color Tone |
|---|---|---|---|---|
| 10 | (structure with COOH, C=O, N(CH₃)₂, CH₃–N–CH₃) | (structure with CH₂=C, C₂H₅/C₂H₅ N, CH₃) | (structure with CH₃, C₂H₅/C₂H₅ N, CH=C, C=O, CH₃–N–CH₃, CH₃/CH₃ N) | Bluish Green |
| 11 | " | (structure with CH₂=C, C₂H₅/C₂H₅ N, Cl) | (structure with Cl, C₂H₅/C₂H₅ N, CH=C, C=O, CH₃–N–CH₃, CH₃/CH₃ N) | Bluish Green |

TABLE 1-continued

| No. | [Ia] | [Ib] | [I] | Developed Color Tone |
|---|---|---|---|---|
| 12 | " | (structure with pyrrolidine-NH, chlorophenyl, CH₂=C) | (structure with pyrrolidine-NH, chlorophenyl, dimethylamino groups, CH=C-O-C=O, CH₃-N-CH₃) | Bluish Green |
| 13 | (structure with (CH₃)₂N-phenyl-C(=O)-phenyl-COOH, CH₃-N-CH₃) | (structure with N(C₂H₅)₂, C₂H₅-phenyl, CH₂=C) | (structure with N(C₂H₅)₂, C₂H₅-phenyl, dimethylamino, CH=C-O-C=O, CH₃-N-CH₃) | Bluish Green |

TABLE 1-continued

| No. | [Ia] | [Ib] | [I] | Developed Color Tone |
|---|---|---|---|---|
| 14 | (structure) | (structure) | (structure) | Bluish Green |
| 15 | | (structure) | (structure) | Bluish Green |
| 16 | (structure) | (structure) | (structure) | Bluish Green |

TABLE 1-continued

| No. | [Ia] | [Ib] | [I] | Developed Color Tone |
|---|---|---|---|---|
| 17 | " | (structure) | (structure) | Bluish Green |
| 18 | (structure) | (structure) | (structure) | Bluish Green |
| 19 | (structure) | (structure) | (structure) | Bluish Green |

TABLE 1-continued

| No. | [Ia] | [Ib] | [I] | Developed Color Tone |
|---|---|---|---|---|
| 20 | (structure) | (structure) | (structure) | Bluish Green |
| 21 | (structure) | (structure) | (structure) | Bluish Green |
| 22 | (structure) | (structure) | (structure) | Bluish Green |

TABLE 1-continued

| No. | [Ia] | [Ib] | [I] | Developed Color Tone |
|---|---|---|---|---|
| 23 | | | | Bluish Green |
| 24 | | | | Bluish Green |
| 25 | | | | Bluish Green |

TABLE 1-continued

| No. | [Ia] | [Ib] | [I] | Developed Color Tone |
|---|---|---|---|---|
| 26 | (structure with 2-CH₃, 4-N(C₂H₅)₂ benzoyl and 2-COOH, 4-N(CH₃)₂ benzoyl) | (structure with CH₂= linked to phenyl and 4-N(C₂H₅)₂ phenyl) | (phthalide structure with 2-CH₃, 4-N(C₂H₅)₂ phenyl, phenyl, 4-N(C₂H₅)₂ phenyl, and 4-N(CH₃)₂) | Bluish Green |
| 27 | (structure with 2-OCH₃, 4-N(C₂H₅)₂ benzoyl and 2-COOH, 4-N(CH₃)₂ benzoyl) | (structure with CH₂= linked to phenyl and 4-N(C₂H₅)₂ phenyl) | (phthalide structure with 2-OCH₃, 4-N(C₂H₅)₂ phenyl, phenyl, 4-N(CH₃)₂ phenyl, and 4-N(CH₃)₂) | Bluish Green |
| 28 | (structure with 2-OC₂H₅, 4-N(C₂H₅)₂ benzoyl and 2-COOH, 4-N(CH₃)₂ benzoyl) | (structure with CH₂= linked to phenyl and 4-N(C₂H₅)₂ phenyl) | (phthalide structure with 2-OC₂H₅, 4-N(C₂H₅)₂ phenyl, phenyl, 4-N(C₂H₅)₂ phenyl, and 4-N(CH₃)₂) | Bluish Green |

TABLE 1-continued

| No. | [Ia] | [Ib] | [I] | Developed Color Tone |
|---|---|---|---|---|
| 29 | | | | Bluish Green |
| 30 | | | | Green |
| 31 | | | | Green |

TABLE 1-continued

| No. | [Ia] | [Ib] | [I] | Developed Color Tone |
|---|---|---|---|---|
| 32 | | | | Green |
| 33 | | | | Green |
| 34 | | | | Bluish Green |

TABLE 1-continued

| No. | [Ia] | [Ib] | [I] | Developed Color Tone |
|---|---|---|---|---|
| 35 | (structure) | (structure) | (structure) | Green |
| 36 | (structure) | (structure) | (structure) | Bluish Green |
| 37 | | (structure) | (structure) | Bluish Green |

TABLE 1-continued

| No. | [Ia] | [Ib] | [I] | Developed Color Tone |
|---|---|---|---|---|
| 38 | " | structure with N(C3H7)2 phenyl, CH2=C, phenyl | structure with N(C3H7)2, OCH3, N(CH3)2 groups, CH=C, C=O, O | Bluish Green |
| 39 | structure with OCH3, COOH, C=O, N(CH3)2 | structure with N(CH3)2 phenyl, CH2=C, phenyl | structure with N(CH3)2, OCH3, N(CH3)2 groups, CH=C, C=O, O | Bluish Green |
| 40 | structure with OCH3, CO, C=O, N(CH3)2 | structure with N(CH3)2 phenyl, Cl, CH2=C, phenyl | structure with N(CH3)2, Cl, OCH3, N(CH3)2 groups, CH=C, C=O, O | Bluish Green |

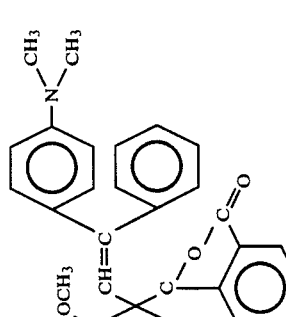

TABLE 1-continued

| No. | [Ia] | [Ib] | [I] | Developed Color Tone |
|---|---|---|---|---|
| 44 | 2-CH₃, 4-N(CH₃)₂ benzoyl benzoic acid | 2-[N(CH₃)₂]-phenyl, phenyl methylene | corresponding phthalide | Bluish Green |
| 45 | 2-OCH₃, 4-N(C₂H₅)₂ benzoyl benzoic acid | 2-[N(CH₃)₂]-phenyl, 4-Cl-phenyl methylene | corresponding phthalide | Bluish Green |
| 46 | 2-C₂H₅, 4-N(CH₃)₂ benzoyl benzoic acid | 2-[N(CH₃)₂]-phenyl, 4-CH₃-phenyl methylene | corresponding phthalide | Bluish Green |

TABLE 1-continued
| No. | [Ia] | [Ib] | [I] | Developed Color Tone |
|---|---|---|---|---|
| 47 | 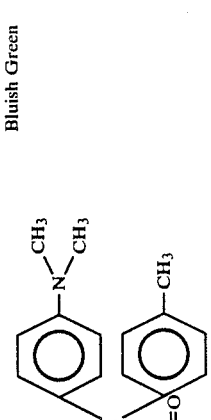 | 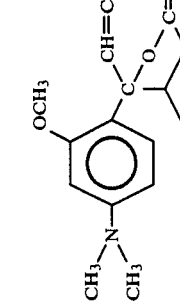 | 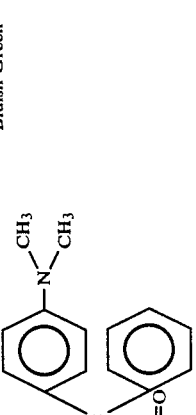 | Bluish Green |
| 48 | 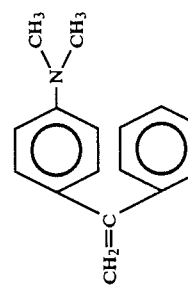 | 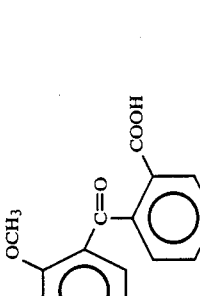 | 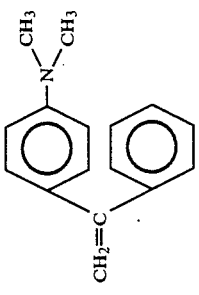 | Bluish Green |
| 49 | 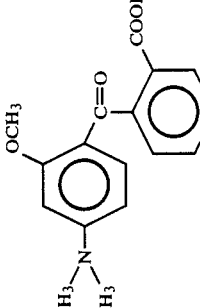 |  | 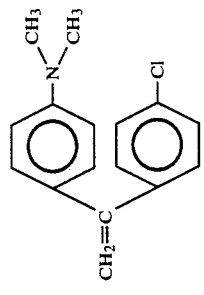 | Bluish Green |

TABLE 1-continued

| No. | [Ia] | [Ib] | [I] | Developed Color Tone |
|---|---|---|---|---|
| 50 | structure with 2-methyl-4-dimethylaminophenyl, C=O, COOH, and 4-dimethylaminophenyl groups | 2-methylphenyl and 4-dimethylaminophenyl with CH₂=C | lactone structure with 2-methyl-4-dimethylaminophenyl, 4-dimethylaminophenyl, 4-dimethylaminophenyl and 4-methylphenyl groups | Bluish Green |
| 51 | structure with 2-methyl-4-(isoC₃H₇)(CH₃)N-phenyl, C=O, COOH, and 4-dimethylaminophenyl groups | phenyl and 4-dimethylaminophenyl with CH₂=C | lactone structure with 2-methoxy-4-(isoC₃H₇)(CH₃)N-phenyl, phenyl, 4-dimethylaminophenyl and 4-dimethylaminophenyl groups | Bluish Green |
| 52 | structure with 2-methoxy-4-(cyclohexyl)(CH₃)N-phenyl, C=O, COOH, and 4-dimethylaminophenyl groups | phenyl and 4-dimethylaminophenyl with CH₂=C | lactone structure with 2-methoxy-4-(cyclohexyl)(CH₃)N-phenyl, phenyl, 4-dimethylaminophenyl and 4-dimethylaminophenyl groups | Bluish Green |

TABLE 1-continued

| No. | [Ia] | [Ib] | [I] | Developed Color Tone |
|---|---|---|---|---|
| 53 | (structure) | (structure) | (structure) | Bluish Green |
| 54 | (structure) | (structure) | (structure) | Bluish Green |
| 55 | (structure) | (structure) | (structure) | Bluish Green |

TABLE 1-continued

| No. | [Ia] | [Ib] | [I] | Developed Color Tone |
|---|---|---|---|---|
| 56 | (structure) | (structure) | (structure) | Bluish Green |
| 57 | (structure) | (structure) | (structure) | Bluish Green |
| 58 | (structure) | (structure) | (structure) | Bluish Green |

TABLE 1-continued

| No. | [Ia] | [Ib] | [I] | Developed Color Tone |
|---|---|---|---|---|
| 59 | | | | Bluish Green |
| 60 | | | | Bluish Green |
| 61 | | | | Bluish Green |

TABLE 1-continued

| No. | [Ia] | [Ib] | [I] | Developed Color Tone |
|---|---|---|---|---|
| 62 | (structure with isoC₄H₉, C₂H₅, C₂H₅ substituents on benzophenone with COOH) | (structure with N(CH₃)₂ diphenylmethylene) | (structure with isoC₄H₉/C₂H₅-N, C₂H₅, and N(CH₃)₂ substituents) | Bluish Green |

In the present invention, the phthalide compounds having the general formula [I] can be used in combination with conventional leuco dyes.

Examples of such conventional leuco dyes are triphenylmethane-type leuco compounds, fluoran-type leuco compounds, phenothiazine-type leuco compounds, auramine-type leuco compounds, spiropyran-type leuco compounds and indolinophthalide-type leuco compounds are preferably employed.

Specific examples of those leuco dyes are as follows:
3,3-bis(p-dimethylaminophenyl)-phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromethylanilino)fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino)fluoran,
benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)fluoran,
3-(N-benzyl-N-cyclohexylamino)-5,6-benzo-7-α-naphthylamino-4'-bromofluoran, and
3-diethylamino-6-methyl-7-mesidino-4',5'-benzofluoran.

In the present invention, a variety of conventional electron acceptors and oxidizing agents such as inorganic acids, organic acids, phenolic materials, and phenolic resins as shown below, can be used as color developers.

Specific examples of such color developers are bentonite, zeolite, acidic terra abla, active terra abla, colloidal silica, zinc oxide, zinc chloride, zinc bromide, aluminum chloride, salicylic acid, 3-tert-butylsalicylic acid, 3,5-di-tert-butylsalicylic acid, di-m-chlorophenyl thiourea, di-m-trifluoromethylphenyl thiourea, diphenylthiourea, salicylanilide, 4,4'-isopropylidenediphenol, 4,4'-isopropylidenebis(2-chlorophenol), 4,4'-isopropylidenebis(2,6-dibromophenol), 4,4'-isopropylidenebis(2,6-dichlorophenol), 4,4'-isopropylidenebis-(2-methylphenol), 4,4'-isopropylidenebis(2,6-dimethylphenol), 4,4'-isopropylidenebis(2-tert-butylphenol), 4,4'-sec-butylidenediphenol, 4,4'-cyclohexylidenebisphenol, 4,4'-cyclohexylidenebis(2-methylphenol), 4-tert-butylphenol, 4-phenylphenol, 4-hydroxydiphenoxide, α-naphthol, β-naphthol, dimethyl 5-hydroxyphthalate, methyl-4-hydroxybenzoate, 4-hydroxyacetophenone, novolak-type phenolic resin, 2,2'-thiobis(4,6-dichlorophenol), catechol, resorcinol, hydroquinone, pyrogallol, phloroglucine, phloroglucino-carboxylic acid, 4-tert-octylcatechol, 2,2'-methylene-bis-(4-chlorophenol), 2,2'-methylenebis(4-methyl-6-tert-butylphenol), 2,2'-dihydroxydiphenyl, ethyl p-hydroxybenzoate, propyl p-hydroxybenzoate, butyl p-hydroxybenzoate, benzyl p-hydroxybenzoate, p-chlorobenzyl p-hydroxybenzoate, o-chlorobenzyl p-hydroxybenzoate, p-methylbenzyl p-hydroxybenzoate, n-octyl p-hydroxybenzoate, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4,2'-diphenol sulfone, 4-hydroxy-4'-chlorodiphenyl sulfone, bis(4-hydroxyphenyl)sulfide, 2-hydroxy-p-toluic acid, zinc 3,5-di-tert-butylsalicylate, tin 3,5-di-tert-butylsalicylate, tartaric acid, oxalic acid, maleic acid, citric acid, succinic acid, stearic acid, 4-hydroxyphthalic acid, boric acid, biimidazole, hexaphenyl biimidazole, and carbon tetrabromide, methylenebis-(oxyethylenethio)diphenol, ethylenebis-(oxyethylenethio) diphenol, bis-(4-hydroxyphenylthioethyl)ketone, bis-(4-hydroxyphenylthioethyl)ether, m-xylylenebis(4-hydroxyphenylthio)ether.

In the present invention, the color developers having the general formula [II] are particularly preferable for preparing a thermosensitive recording material which is capable of yielding images which are highly resistant to light as mentioned previously.

Specific examples of such color developers are:

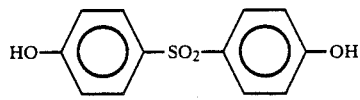

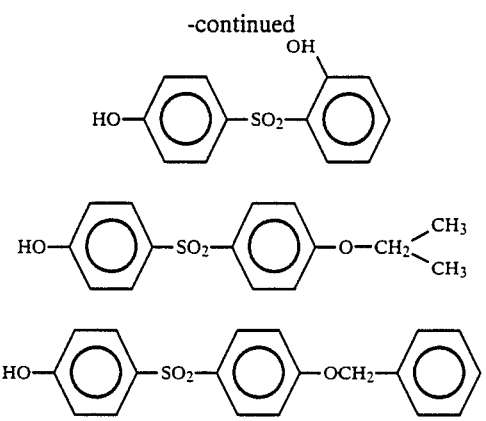

The previously mentioned color developers can also be employed in combination with any of the above color developers.

In the present invention, a variety of conventional binder agents can be employed for binding the above mentioned leuco dyes and color developers in the thermosensitive coloring layer to the support material. In order to prepare a pressure-sensitive recording material, the same conventional binder agents can also be employed for binding a microcapsuled leuco dye to its support, and for binding a color developer to its support.

Specific examples of such binder agents are as follows: polyvinyl alcohol; starch and starch derivatives; cellulose derivatives such as methoxycellulose, hydroxyethylcellulose, carboxymethylcellulose, methylcellulose and ethylcellulose; water-soluble polymeric materials such as sodium polyacrylate, polyvinylpyrrolidone, acrylamide/acrylic acid ester copolymer, acrylamide/acrylic acid ester/methacrylic acid copolymer, styrene/maleic anhydride copolymer alkali salt, isobutylene/maleic anhydride copolymer alkali salt, polyacrylamide, sodium alginate, gelatin and casein; and latexes of polyvinyl acetate, polyurethane, styrene/butadiene copolymer, polyacrylic acid, polyacrylic acid ester, vinyl chloride/vinyl acetate copolymer, polybutylmethacrylate, ethylene/vinyl acetate copolymer and styrene/butadiene/acrylic acid derivative copolymer.

Further in the present invention, auxiliary additive components which are employed in the conventional pressure-sensitive and thermosensitive recording materials, such as a filler, a surface active agent, a thermofusible material (or unguent) and agents for preventing coloring by application of pressure can be employed.

Specific examples of a filler for use in the present invention are finely-divided inorganic powders of calcium carbonate, silica, zinc oxide, titanium oxide, aluminum hydroxide, zinc hydroxide, barium sulfate, clay, talc, surface-treated calcium and surface-treated silica, and finely-divided organic powders of urea-formaldehyde resin, styrene/methacrylic acid copolymer, and polystyrene.

Examples of an unguent are higher fatty acids, metal salts thereof, higher fatty acid amides, higher fatty acid esters, and waxes such as animal waxes, vegetable waxes and petroleum waxes.

In the present invention, when a pressure-sensitive recording material is prepared, a color developer sheet is prepared as follows. A color developer is dispersed or dissolved in water or an organic solvent with addition thereto of an appropriate dispersing agent, such as a block copolymer of polyoxypropylene-polyoxyethylene, and an appropriate binder agent to prepare a dispersion or solution. The thus prepared dispersion or solution is applied to a support such as a sheet of paper, whereby a color developer sheet is prepared. A coloring sheet is prepared by dispersing a microcapsulated leuco dye in an appropriate solvent with addition thereto of a dispersing agent, and applying the dispersion to a support such as a sheet of paper. The microcapsuling of the leuco dye is carried out by such a conventional method as described in U.S. Pat. No. 2,800,457.

A thermosensitive recording material according to the present invention is prepared by preparing a dispersion of a leuco dye and a dispersion of a color developer separately, mixing these dispersions with addition thereto of an appropriate binder agent, and applying the mixed dispersion to a support such as a sheet of paper to form a thermosensitive coloring layer thereon.

The thermosensitive coloring layer can be formed so as to include a leuco dye layer and a color developer layer or a plurality of leuco dye layers and color developer layers. Furthermore, an undercoat layer can be formed between the support and thermosensitive coloring layer. A protective layer can also be formed on the thermosensitive coloring layer.

Furthermore, a thermal image transfer type recording material can be prepared, in which the leuco dye and the color developer are supported on two supports separately, that is, an image transfer sheet consisting of a heat resistant sheet made of, for instance, a polyester film, coated with a leuco dye, and an image receiving sheet consisting of a support coated with a color developer.

The thermosensitive recording material can be modified into a thermosensitive recording label consisting of a support, a thermosensitive coloring layer formed thereon, an adhesive layer formed on the back side of the support opposite to the thermosensitive coloring layer, and a disposable backing sheet applied to the adhesive layer. A protective layer comprising a water-soluble resin can also be formed on the thermosensitive coloring layer to enhance the stability of recorded images.

The features of this invention will become apparent in the course of the following description of exemplary embodiments, which are given for illustration of the invention and are not intended to be limiting thereof.

EXAMPLE 1

4.45 g of 4-dimethylamino-4'-dimethylamino-benzophenone-2'-carboxylic acid and 3.35 g of 1-phenyl-1-(p-dimethylaminophenyl)ethylene were added to 15 ml of acetic anhydride to prepare a reaction mixture. This reaction mixture was heated to 45°~70° C. and stirred for 1 hour. The reaction mixture was then added to 200 ml of water. The mixture was then neutralized with addition of an aqueous 10% solution of sodium hydroxide. A precipitate separated out.

The precipitate was dissolved in 100 ml of concentrated hydrochloric acid and the solution was filtered. The filtered solution was then neutralized with addition of an aqueous 10% solution of sodium hydroxide. A precipitate separated out, which was filtered off. The thus obtained product was purified by column chromatography and recrystallization, whereby a phthalide compound No. 1 in Table 1 was obtained in the form of light grey powder, with a yield of 7.0 g.

$\lambda_{max}$ of an acetic acid 95% solution of the phthalide compound No. 1 was 750 nm.

EXAMPLE 2

6.54 g of 4-diethylamino-2-methoxybenzophenone-2'-carboxylic acid and 4.46 g of 1-phenyl-1-(p-dimethylaminophenyl)ethylene were added to 20 ml of acetic anhydride to prepare a reaction mixture. This reaction mixture was heated to 45°~55° C. and stirred for 1 hour. The reaction mixture was cooled to room temperature and then added to 200 ml of water. The mixture was neutralized with addition of an aqueous 10% solution of sodium hydroxide. A precipitate separated out.

The precipitate was dissolved in 100 ml of concentrated hydrochloric acid and the solution was filtered. The filtered solution was then neutralized with addition of an aqueous 10% solution of sodium hydroxide. A precipitate separated out, which was filtered off. The thus obtained product was recrystallized from methanol, whereby a phthalide compound No. 33 in Table 1 was obtained in the form of white powder, with a yield of 10 g. The melting point of the product was 78°~80° C.

$\lambda_{max}$ of an acetic acid 95% solution of the phthalide compound No. 33 was 737 nm.

Phthalide compounds Nos. 2 to 32 and 34 to 62 in Table 1 were synthesized using the corresponding starting materials shown in Table 1, under substantially the same conditions as the above-mentioned conditions.

$\lambda_{max}$ of an acetic acid 95% solution of the following phthalide compound, which is similar in chemical structure to Phthalide Compound No. 1, was 728 nm:

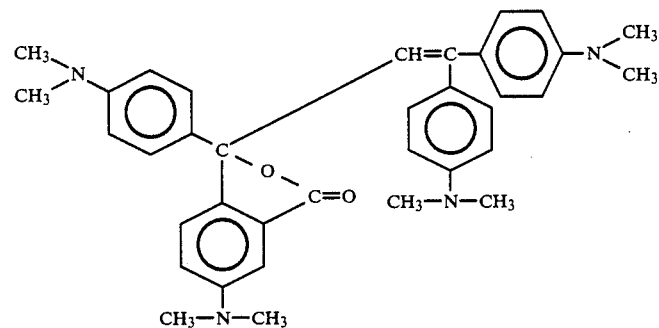

$\lambda_{max}$ of an acetic acid 95% solution of the following phthalide compound, which is similar in chemical structure to Phthalide Compound No. 33, was 753 nm:

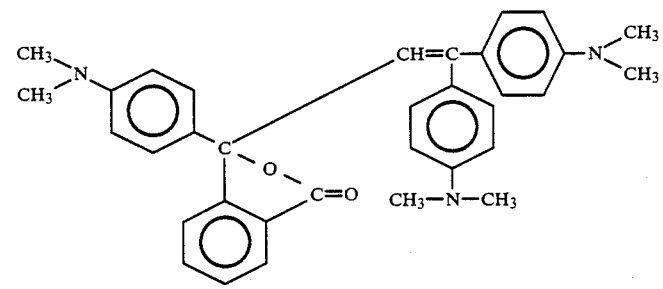

[Preparation of Microcapsuled Leuco Dyes]

10 parts by weight of gelatin and 10 parts by weight of gum arabi are dissolved in 400 parts by weight of water. To this solution, 0.2 parts by weight of Turkey red oil serving as emulsifying agent are added. Any of the phthalide leuco dyes represented by the general formula [I] is dissolved in diisopropryl napthalene oil with a concentration of 2%. 40 parts by weight of the diisopropyl naphthalene oil solution are added to the above prepared solution and the mixture is emulsified. When the average particle size of the droplets in the emulsion becomes 5 μm, the emulsifying operation is terminated. To this emulsion, water warmed to 40° C. is added until the entire volume of the mixture became 900 parts by weight. The mixture is stirred, with its temperature maintained not less than 40° C. An aqueous 10% solution of acetic acid is added to this mixture so that the pH of the mixture is adjusted to be in the range of 4.0 to 4.2, thereby coacervation is caused to take place. The stirring is continued for another 20 minutes. The mixture is then cooled so that a coacervated film deposited on each droplet was caused to be geled. With the temperature of the mixture adjusted to be 20° C., 7 parts by weight of an aqueous 37% solution of formaldehyde are added to the mixture. When the temperature of the mixture becomes 10° C., an aqueous 15% solution of sodium hydroxide is gradually added to the mixture so that the pH of the mixture is adjusted to be 9. The mixture is heated to 50° C., with stirring, taking a period of time of 20 minutes, whereby microcapsules of the leuco dye which is dissolved in the diisopropyl naphthalene oil are prepared.

When a pressure-sensitive sheet is prepared, the thus prepared microcapsules are applied to a support, with a deposition ranging from 5 g/m² to 10 g/m².

EXAMPLES 3~7 AND COMPARATIVE EXAMPLES 1 & 2

On a commercially available pressure-sensitive color developing sheet containing as a color developer acidic terra abla, a coloring sheet coated with a microcapsuled leuco dye listed in Table 2 in an amount of 6 g/m² when dried, using a water-soluble starch as binder agent for the leuco dye, was superimposed. By hand writing, pressure-sensitive coloring was caused to take place, so that clear images in green to dark greenish blue were obtained.

The PCS value of each obtained image, defined by the following formula, and measured by a commercially available spectrophotometer (Trademark "Hitachi 303 Type Spectrophotometer" made by Hitachi, Ltd.) when exposed to the light having a wavelength of 800 nm, is shown in Table 2.

$$PCS \text{ Value } (\%) = \frac{\left(\begin{array}{c}\text{Reflection Ratio}\\\text{of Background}\end{array}\right) - \left(\begin{array}{c}\text{Reflection Ratio}\\\text{of Image Area}\end{array}\right)}{\text{Reflection Ratio of Background}} \times 100\%$$

TABLE 2

| | Phthalide Leuco Dyes | PCS Value |
|---|---|---|
| Example 3 | No. 1 in TABLE 1 | 90% or more |
| Example 4 | No. 22 in TABLE 1 | 90% or more |
| Example 5 | No. 27 in TABLE 1 | 90% or more |
| Example 6 | No. 44 in TABLE 1 | 90% or more |
| Example 7 | No. 47 in TABLE 1 | 90% or more |
| Comp. Ex. 1 | Crystal Violet Lactone | 30% or below |
| Comp. Ex. 2 | 3-diethylamino-6-methyl-7-anilinofluoran | 30% or below |

EXAMPLES 8~16, COMPARATIVE EXAMPLES 3 & 4

[Preparation of Coloring Liquid (Liquid A-1) and Color Developer Liquid (Liquid B-1)]

The following Liquid A and Liquid B were prepared by grinding the respective components in a ceramic ball mill for 2 to 4 hours:

[Liquid A]

| | Parts by Weight |
|---|---|
| Phthalide Leuco dye in TABLE 3 | 20 |
| Aqueous 10% solution of polyvinyl alcohol | 10 |
| Dispersing agent (block copolymer of polyoxypropylene and polyoxyethylene) | 0.3 |
| Water | 37 |

[Liquid B-1]

| | Parts by Weight |
|---|---|
| 4,4'-methylenebis-(oxyethylenethio) diphenol | 60 |
| 3,3',5,5'-tetrabromobisphenol S | 20 |
| Calcium carbonate | 80 |
| Aqueous 10% solution of polyvinyl alcohol | 160 |
| Dispersing agent (block copolymer of polyoxypropylene and polyoxyethylene) | 1 |
| Water | 320 |

Liquid A-1 and Liquid B-1 were mixed with a ratio by parts weight of 1:1, whereby a thermosensitive layer coating liquid was prepared. This coating liquid was coated on a sheet of high quality paper having a basis weight of 50 g/m², whereby thermosensitive recording materials Nos. 1 through 9 according to the present invention and comparative thermosensitive recording materials Nos. 1 and 2 were prepared.

The thus prepared thermosensitive recording materials were subjected to thermal printing by use of a thermal printing test apparatus including a thermal head of a thin film type (made by Matsushita Electronic Components Co., Ltd.) under the conditions that the power applied to the head was 0.37 W/dot, the recording time per line was 5 msec, the scanning line density was 8×3.85 dots/mm, and the pulse width applied thereto was 5 msec/l. The densities of the developed images and the background thereof were measured by Macbeth densitometer RD-514 with a filter W-106.

The PCS value of each thermosensitive recording material was also measured in the same manner as previously mentioned.

TABLE 3

| | Phthalide Leuco Dyes | Background Density | Developed Color Tone | PCS Value at 800 nm |
|---|---|---|---|---|
| Example 8 | No. 1 | 0.06 | Greenish Blue | 90% or more |
| Example 9 | No. 11 | 0.06 | Greenish Blue | 90% or more |
| Example 10 | No. 22 | 0.06 | Greenish Blue | 90% or more |
| Example 11 | No. 27 | 0.06 | Greenish Blue | 90% or more |
| Example 12 | No. 33 | 0.06 | Green | 90% or more |
| Example 13 | No. 37 | 0.09 | Green | 90% or more |
| Example 14 | No. 44 | 0.10 | Greenish Blue | 90% or more |
| Example 15 | No. 47 | 0.10 | Bluish Green | 90% or more |
| Example 16 | No. 50 | 0.11 | Bluish Green | 90% or more |
| Comp. Example 3 | Crystal Violet Lactone | 0.08 | Bluish Violet | 30% or below |
| Comp. Example 4 | 3-diethylamino 6-methyl-7-anilino fluoran | 0.07 | Black | 30% or below |

EXAMPLE 17

Liquid A-2 and Liquid B-2 were prepared by dispersing the respective components in a sand grinder for 2 to 4 hours.

[Liquid A-2]

| | Parts by Weight |
|---|---|
| 3-p-dimethylaminophenyl-3-[(1-p-dimethylaminophenyl-1-phenyl-ethyleno)-2]phthalide | 10 |
| Aqueous 10% solution of polyvinyl alcohol | 10 |

-continued

|  | Parts by Weight |
|---|---|
| Water | 80 |

[Liquid B-2]

|  | Parts by Weight |
|---|---|
| 4,4'dihydroxyphenylsulfone | 20 |
| Aqueous 10% solution of polyvinyl alcohol | 20 |
| Water | 60 |

Liquid A-2 and Liquid B-2 were mixed and dispersed with a ratio by weight of 1:2, so that a thermosensitive coating liquid was prepared. This thermosensitive coating liquid was coated on a sheet of high quality paper having a basis weight of 52 g/cm$^2$, with a deposition of 5 to 6 g/m$^2$ when dried, whereby a thermosensitive coloring layer was formed on the high quality paper. After drying, the thermosensitive coloring layer was subjected to calendering until the smoothness became 500 to 3000 seconds in terms of Bekk's smoothness, whereby a thermosensitive recording material No. 10 according to the present invention was prepared.

EXAMPLE 18

Example 17 was repeated except that 3-p-dimethylaminophenyl-3-[(1-p-dimethylaminophenyl-1-phenylethyleno)-2]phthalide in Liquid A-2 was replaced with 3-p-dimethylaminophenyl-3-[(1-p-dimethylaminophenyl-1-phenylethyleno)-2]-6-dimethylaminophthalide, whereby a thermosensitive recording material No. 11 according to the present invention was prepared.

EXAMPLE 19

Example 17 was repeated except that 3-p-dimethylaminophenyl-3-[(1-p-dimethylaminophenyl-1-phenylethyleno)-2]phthalide in Liquid A-2 was replaced with 3-p-pyrrolidinophenyl-3-[(1-p-diethylaminophenyl-1-phenylethyleno)-2]-6-dimethylaminophthalide, whereby a thermosensitive recording material No. 12 according to the present invention was prepared.

EXAMPLE 20

Example 17 was repeated except that 4,4'-dihydroxyphenylsulfone in Liquid B-2 was replaced with 2,4'-dihydroxy-phenylsulfone, whereby a thermosensitive recording material No. 13 according to the present invention was prepared.

EXAMPLE 21

Example 17 was repeated except that 4,4'-dihydroxyphenylsulfone in Liquid B-2 was replaced with 4-hydroxyphenyl-4'-benzyloxyphenylsulfone, whereby a thermosensitive recording material No. 14 according to the present invention was prepared.

EXAMPLE 22

Example 17 was repeated except that 4,4'-dihydroxyphenylsulfone in Liquid B-2 was replaced with 4-hydroxyphenyl-4'-isopropyloxyphenylsulfone, whereby a thermosensitive recording material No. 15 according to the present invention was prepared.

EXAMPLE 23

Example 17 was repeated except that 4,4'-dihydroxyphenylsulfone in Liquid B-2 was replaced with 2,2'-bis-(4-hydroxyphenyl)propane, whereby a thermosensitive recording material No. 16 according to the present invention was prepared.

EXAMPLE 24

Example 17 was repeated except that 4,4'-dihydroxyphenylsulfone in Liquid B-2 was replaced with 4,4'-thiobis (3-methyl-6-tert-butylphenolsulfide), whereby a thermosensitive recording material No. 17 according to the present invention was prepared.

The thus prepared thermosensitive recording materials Nos. 10~17 were subjected to thermal printing by use of the same thermal printing test apparatus as that employed in Examples 8~16. The recording materials were also subjected to a light resistance test by exposing each recording material to the sun shine for 3 days. The PCS value of each thermosensitive recording material having a colored image was also measured before and after the light resistance test, using the light having a wavelength of 800 nm.

The results are shown in Table 4.

TABLE 4

|  | Immediately after Printing | | After Light Resistant Test | |
|---|---|---|---|---|
|  | Image Density | PCS Value | Image Density | PCS Value |
| Example 17 | 1.30 | 91% | 1.25 | 88% |
| Example 18 | 1.34 | 90% | 1.30 | 87% |
| Example 19 | 1.35 | 92% | 1.28 | 89% |
| Example 20 | 1.30 | 90% | 1.24 | 87% |
| Example 21 | 1.29 | 90% | 1.24 | 86% |
| Example 22 | 1.31 | 89% | 1.23 | 86% |
| Example 23 | 1.30 | 90% | 0.92 | 35% |
| Example 24 | 1.31 | 91% | 0.80 | 45% |

The novel coloring phthalide compounds according to the present invention, when colored, highly absorb the light in the near infrared region. Further, by using any of such coloring phthalide compounds as coloring component, pressure-sensitive and thermosensitive recording materials capable of yielding images which absorb the light in the near infrared region and having excellent light resistance can be obtained according to the present invention.

Furthermore, the thermosensitive recording materials which use the coloring phthalide compounds according to the present invention are excellent in humidity resistance.

EXAMPLE 25

Liquid A-3 and Liquid B-3 were prepared by dispersing the respective components in a sand grinder for 2 to 4 hours.

[Liquid A-3]

|  | Parts by Weight |
|---|---|
| 3-p-dimethylaminophenyl-3-[(1-p-dimethylaminophenyl-1-p-methyl-phenylethyleno)-2]-6-p-dimethylaminophthalide | 10 |
| Aqueous 10% solution of polyvinyl alcohol | 10 |
| Water | 80 |

[Liquid B-3]

| | Parts by Weight |
|---|---|
| 4,4'-dihydroxyphenylsulfone | 20 |
| Aqueous 10% solution of polyvinyl alcohol | 20 |
| Water | 60 |

Liquid A-3 and Liquid B-3 were mixed and dispersed with a ratio by weight of 1:2, so that a thermosensitive coating liquid was prepared. This thermosensitive coating liquid was coated on a sheet of high quality paper having a basis weight of 52 g/cm², with a deposition of 5 to 6 g/m² when dried, whereby a thermosensitive coloring layer was formed on the high quality paper. After drying, the thermosensitive coloring layer was subjected to calendering until the smoothness became 500 to 3000 seconds in terms of Bekk's smoothness, whereby a thermosensitive recording material No. 18 according to the present invention was prepared.

COMPARATIVE EXAMPLE 5

Example 25 was repeated except that the 3-p-dimethylaminophenyl-3-[(1-p-dimethylaminophenyl-1-phenylethyleno)2]-6-p-dimethylaminophthalide in Liquid A-3 employed in Example 25 was replaced with 3-p-dimethylaminophenyl-3-[(1-p-dimethylaminophenyl-1-p-methoxyphenylethyleno)-2]-6-dimethylaminophthalide, whereby a comparative thermosensitive recording No. 5 was prepared.

EXAMPLE 26

Example 25 was repeated except that the 3-p-dimethylaminophenyl-3-[(1-p-dimethylamino-1-p-methylphenylethyleno)2]-6-p-dimethylaminophthalide in Liquid A-3 employed in Example 25 was replaced with 3-p-dimethylaminophenyl-3-[(1-p-dimethylaminophenyl-1-phenylethyleno)-2]phthalide, whereby a thermosensitive recording material No. 19 according to the present invention was prepared.

COMPARATIVE EXAMPLE 6

Example 25 was repeated except that the 3-p-dimethylaminophenyl-3-[(1-p-dimethylaminophenyl-1-p-methylphenylethyleno)-2]-6-p-dimethylaminophthalide in Liquid A-3 employed in Example 25 was replaced with 3-p-dimethylaminophenyl-3-[bis-1,1-(p-dimethylaminophenyl)ethyleno-2]phthalide, whereby comparative recording material No. 6 was prepared.

The thus prepared thermosensitive recording materials Nos. 18 and 19 according to the present invention and comparative thermosensitive recording materials Nos. 5 and 6 were subjected to thermal printing by use of the same thermal printing test apparatus as that employed in Examples 8~16. The densities of the developed images and the background thereof were measured by Macbeth densitometer RD-514 with a filter W-106.

The recording materials were subjected to a humidity resistance test by allowing the recording materials to stand at 40° C., 90% RH for 16 hours. The reflectances (%) of the background of each recording material before and after the humidity resistance test were measured by a commercially available spectrophotometer (Trademark "Hitachi 303 Type Spectrophotometer" made by Hitachi, Ltd.). The smaller the measured reflectance after the humidity resistance test, the greater the fogging in the background.

The PCS value of each of the thermosensitive recording materials having a colored image was also measured by using the light having a wavelength of 800 nm.

The results are shown in Table 5.

TABLE 5

| | Color of Background | PCS (%) 800 nm | Density Background | Developed Image Area | Developed Before Humidity Resistance Test | Developed After Humidity Resistance Test |
|---|---|---|---|---|---|---|
| Example 25 | White | 91.8 | 0.11 | 1.02 | 96.0 | 96.1 |
| Example 26 | White | 91.6 | | | | |
| Comparative Example 5 | White | 91.1 | 0.10 | 1.10 | 91.0 | 75.5 |
| Comparative Example 6 | Yellow-Green | 90.0 | | | | |

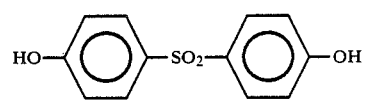

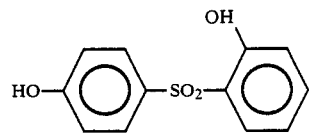

What is claimed is:

1. A thermosensitive recording material comprising a substrate and a thermosensitive coloring layer formed on said substrate, which thermosensitive layer comprises:

a coloring phthalide compound having general formula [I],

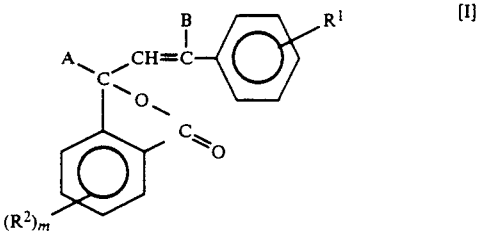

wherein A and B each represent 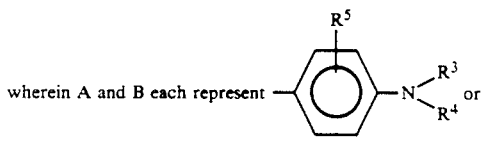 or

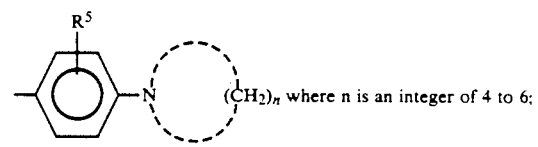 where n is an integer of 4 to 6;

$R^1$ represents hydrogen, an alkyl group, or halogen, m is an integer of 1 to 4, when m is 1, $R^2$ represents hydrogen, an amino group, an alkylamino group, a dialkylamino group, a cyclic amino group, an alkyl group, or halogen, when m is 2 to 4, $R^2$ represents halogen, $R^3$ and $R^4$ each represent a straight chain or branched alkyl group having 1 to 8 carbon atoms, a cyclic alkyl group, or a benzyl group, and $R^5$ represents hydrogen, an alkyl group or an alkoxyl group; and a color developer.

2. A thermosensitive recording material comprising a substrate and a thermosensitive coloring layer formed on said substrate, which thermosensitive layer comprises:

a coloring phthalide compound having general formula [I],

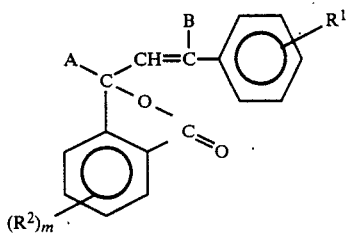

wherein A and B each represent

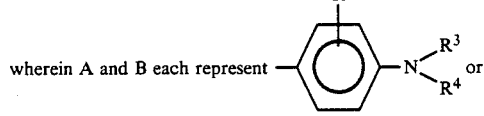

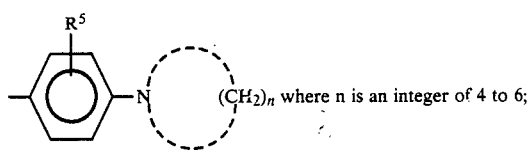

$R^1$ represents hydrogen, an alkyl group, or halogen, m is an integer of 1 to 4, when m is 1, $R^2$ represents hydrogen, an amino group, an alkylamino group, a dialkylamino group, a cyclic amino group, an alkyl group, or halogen, when m is 2 to 4, $R^2$ represents halogen, $R^3$ and $R^4$ each represent a straight chain or branched alkyl group having 1 to 8 carbon atoms, a cyclic alkyl group, or a benzyl group, and $R^5$ represents hydrogen, an alkyl group or an alkoxyl group; and a color developer having general formula [II] which is capable of inducing color formation in said phthalide compound, upon application of heat thereto,

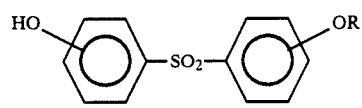

wherein R represents hydrogen, an alkyl group or an aralkyl group.

3. The thermosensitive recording material as claimed in claim 2, wherein said color developer is selected from the group consisting of: